Oct. 20, 1964
J. H. WEST
3,153,485
CAN TESTING MACHINE
Filed July 7, 1961
5 Sheets-Sheet 1
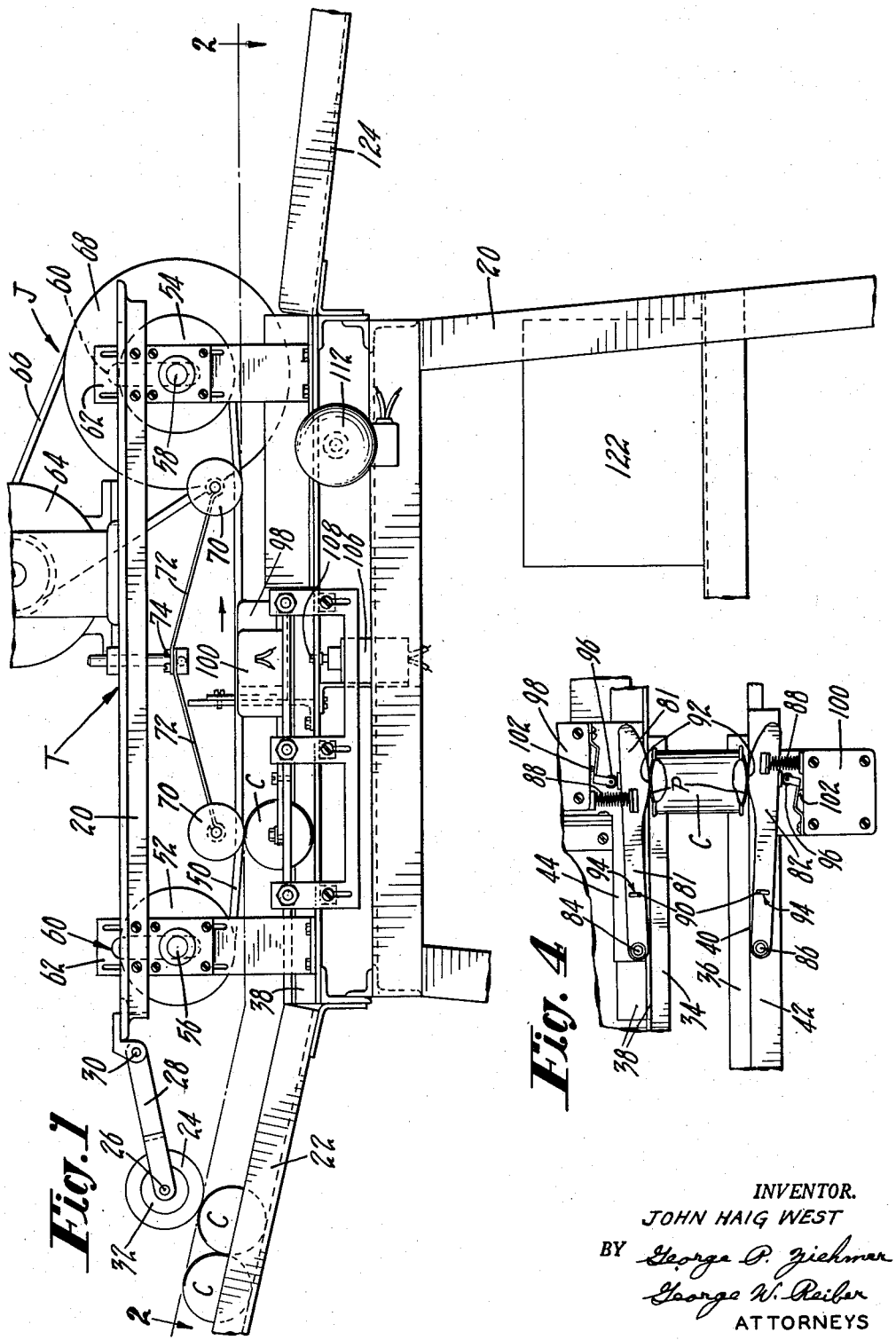
INVENTOR.
JOHN HAIG WEST
BY George P. Ziehmer
George W. Reiber
ATTORNEYS

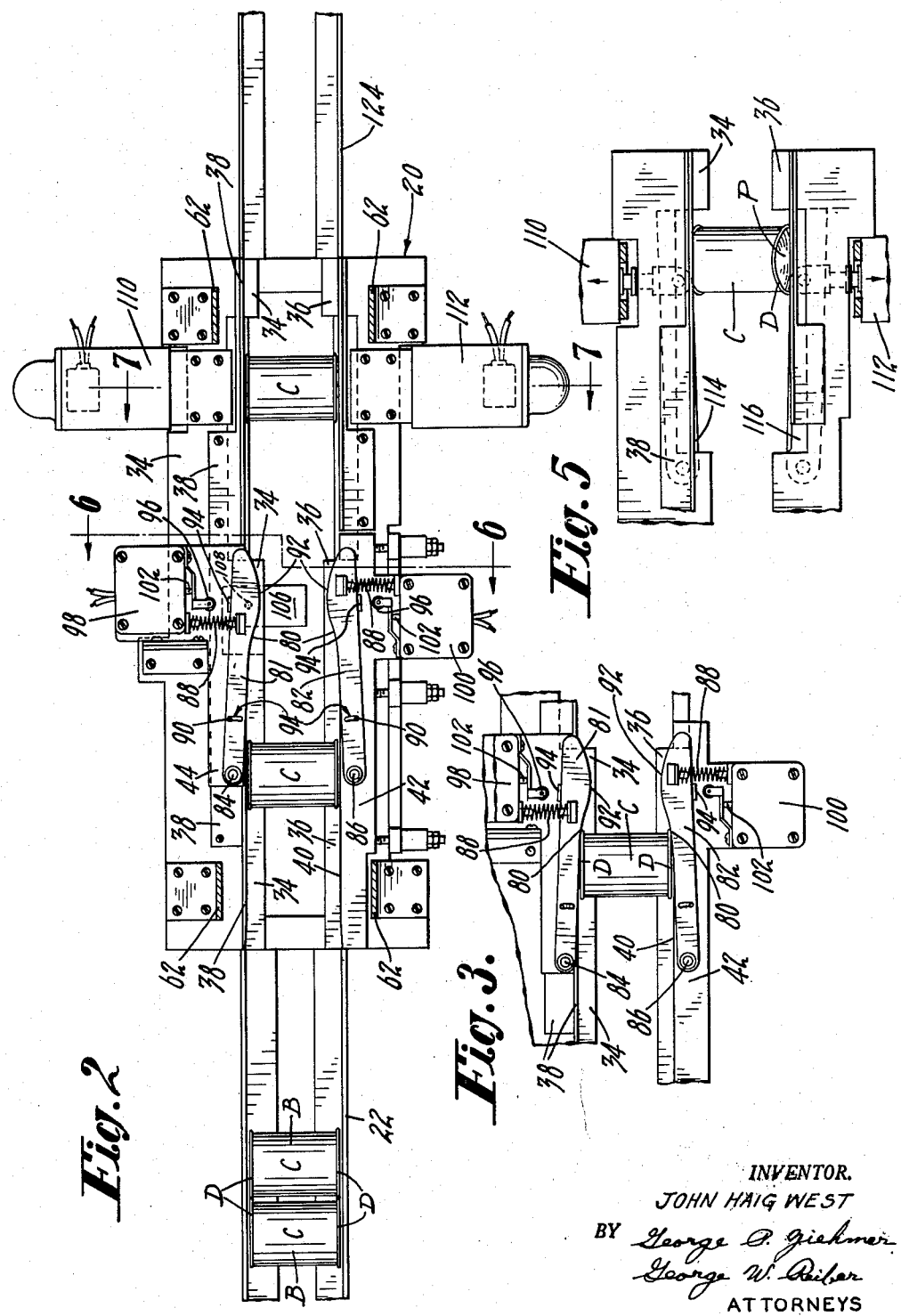

Oct. 20, 1964     J. H. WEST     3,153,485
CAN TESTING MACHINE
Filed July 7, 1961     5 Sheets-Sheet 3

INVENTOR.
JOHN HAIG WEST
BY George P. Ziehmer
George W. Reiber
ATTORNEYS

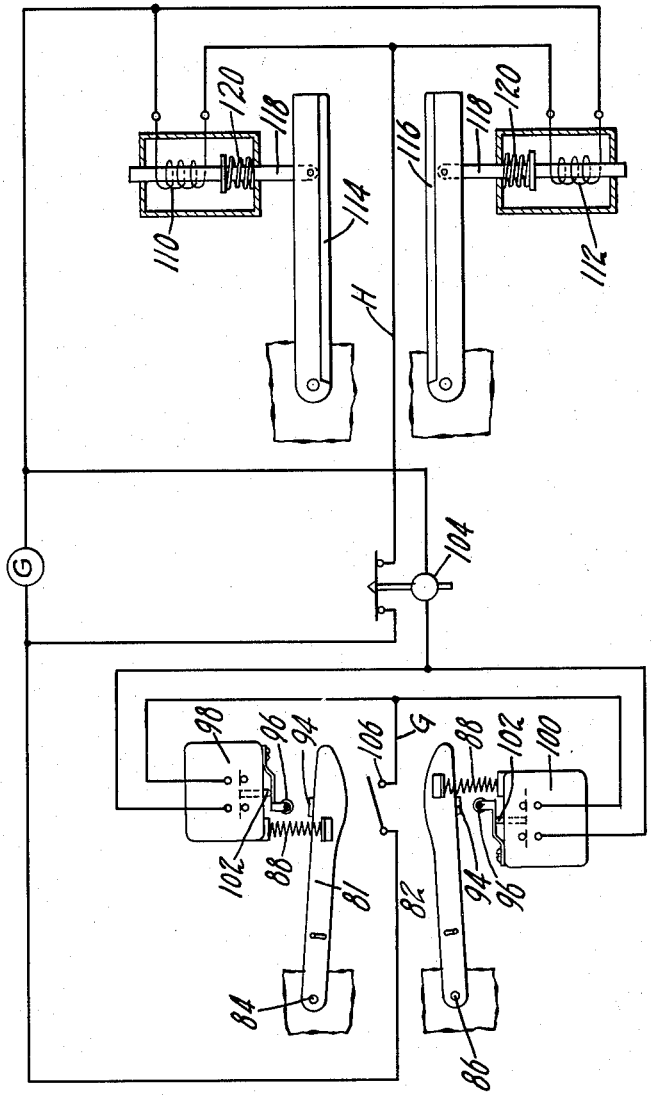
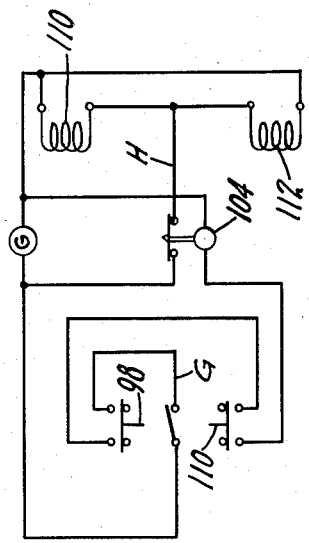
Fig. 8.
Fig. 9.
INVENTOR.
JOHN HAIG WEST
BY George P. Ziehmer
George W. Reiber
ATTORNEYS Oct. 20, 1964  J. H. WEST  3,153,485
CAN TESTING MACHINE
Filed July 7, 1961  5 Sheets-Sheet 5
Fig. 10.
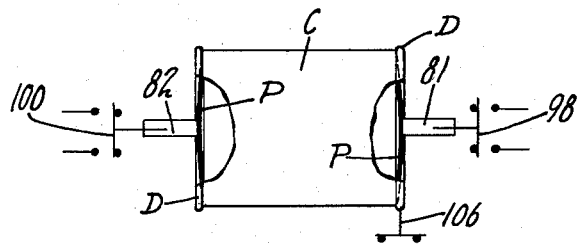
Fig. 11.
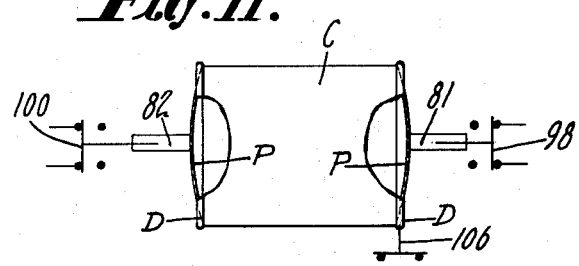
Fig. 14.
Fig. 12.
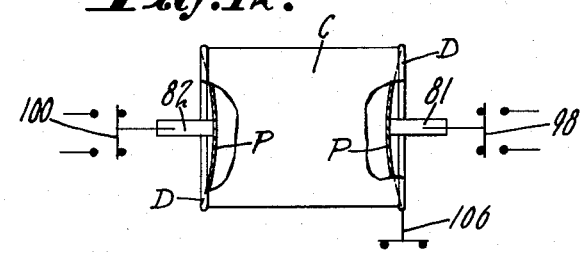
Fig. 13.
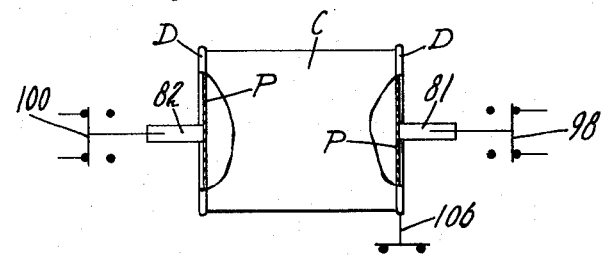
INVENTOR.
JOHN HAIG WEST
BY George P. Niehmer
George W. Reiber
ATTORNEYS

United States Patent Office 3,153,485
Patented Oct. 20, 1964

3,153,485
CAN TESTING MACHINE
John Haig West, Burlington, Ontario, Canada, assignor to American Can Company, New York, N.Y., a corporation of New Jersey
Filed July 7, 1961, Ser. No. 122,552
5 Claims. (Cl. 209—88)

The present invention relates to can testing machines and has particular reference to a machine for detecting defectively sealed or processed cans by probing the can ends to detect abnormal variations in the position of one or both of the flexible can end panels.

In many present day canning procedures which embody vacuum or pressures sealing, non-atmospheric pressures are created within the sealed cans. Frequently, too, such pressures result from the liberation or absorption of gases by the product after the can has been sealed. If these internal pressures vary sufficiently from the atmospheric pressure, they usually result in a flexing of the can end panels. Thus, if a vacuum is present within the can, its end panels are forced to assume a concave shape; if an excessive positive pressure exists, they are bulged outwardly. Normally, the can end panels are so designed that even when in outwardly flexed position they do not project outwardly beyond the planes of the outer edges of the can end seam.

There are, however, numerous situations where the desired vacuums or pressure conditions are not obtained within the cans. For example, if the pressures within the cans are greater than anticipated, as may be caused by food spoilage, the can ends are forced outwardly beyond the end seams, thus producing what are termed by the trade as "rockers." As another example, in instances where the cans are closed under vacuum, if the desired degree of vacuum is not obtained due to leakage of the cans, its end panels will not flex inwardly to the desired degree, but will retain or return to their initially flat contour.

The present invention provides a machine which makes it possible to detect such abnormal pressure conditions within the cans by utilizing pivoted probe arms which engage the opposite end panels of the cans and indicate when they have an abnormal contour. When such abnormal can ends are encountered, the probe arms operate switches which energize a control circuit which operates to eject the abnormal cans from the machine. In order to obviate the need to index the cans into the machine, a master switch is utilized which is wired in series into the control circuit so that the circuit can be closed only when the can is accurately located in testing position, thus preventing actuation of the control circuit by the can end seams as the can enters the testing station.

An object of the present invention is the provision of a can testing mechanism which is simple and inexpensive in construction and which functions to detect and eject cans having abnormal exterior end contours.

Another object of the invention is the provision in such a machine of a pair of can end engaging probe arms which operate independently of each other to detect abnormalities in either or both of the can ends.

Still another object of the invention is the provision in such a machine of cam means formed integral with the probe arms to automatically center the cans between the probe arms without play and without chatter to thereby make possible a very accurate testing operation.

Yet another object is the provision of a can testing machine which may be arranged to detect a wide variety of abnormal can end panel positions.

Numerous other objects and advantages of the invention will be apparent as it is better understood from the following description, which, taken in connection with the accompanying drawings, discloses a preferred embodiment thereof.

Referring now to the drawings:

FIGURE 1 illustrates a side elevation of a can testing machine embodying the principles of the instant invention;

FIG. 2 is a horizontal section taken substantially along the line 2—2 of FIG. 1;

FIG. 3 is a horizontal section similar to FIG. 2 but illustrating only the testing station of the machine, the view showing a can being centered by the inner cam edges of the pivoted probe arms as its enters the testing station;

FIG. 4 is a view similar to FIG. 3 but showing a centered, abnormally bulged can in final testing position in the testing station;

FIG. 5 is a horizontal section similar to FIG. 2 but illustrating only the ejecting station of the machine and showing the abnormally bulged can in the process of being ejected;

Figure 6:
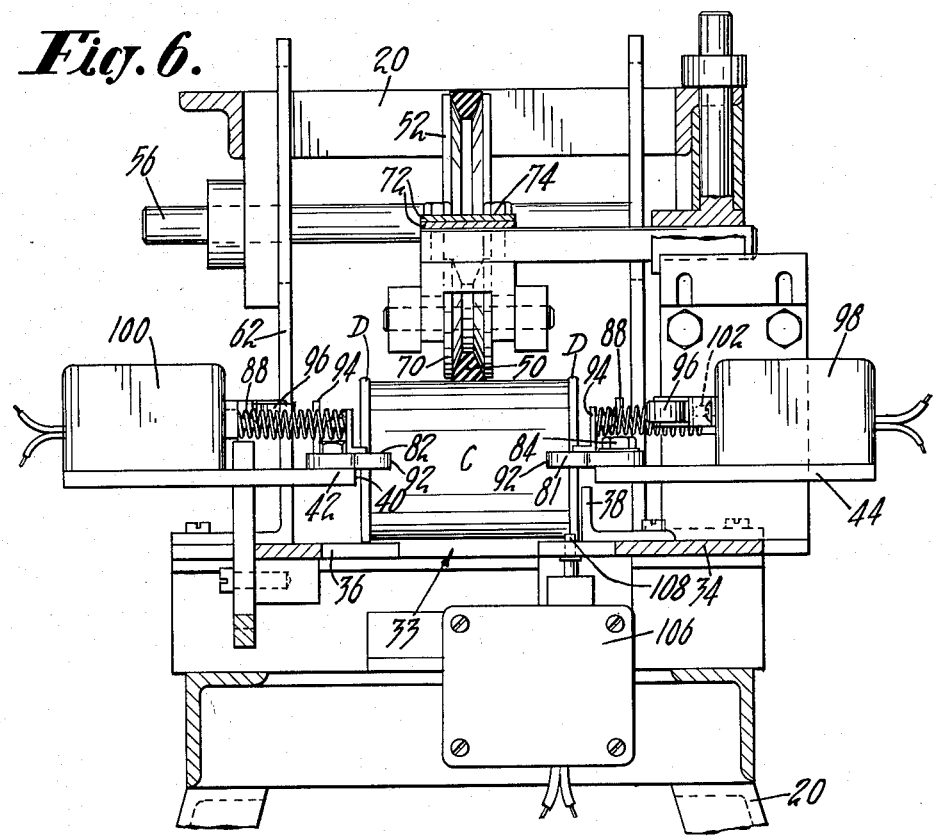
Figure 7:
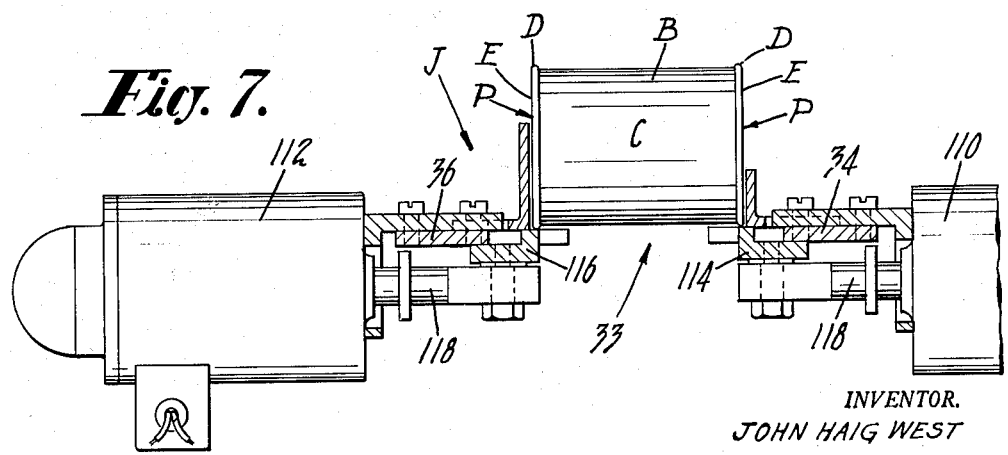

FIGURES 6 and 7 are vertical sections on an enlarged scale taken substantially along the lines 6—6 and 7—7 respectively of FIG. 2;

FIG. 8 is a wiring diagram of the machine of FIGURES 1–8 with the detector switches wired in parallel to each other to detect cans having abnormalities in either or both end panels;

FIG. 9 is a view similar to FIG. 8 but illustrating a modified control circuit wherein the detector switches are wired in series with each other;

FIGURES 10 and 11 are schematic views of the operation of the detector switches of the machine when arranged to detect and eject cans having abnormally bulged ends and to pass cans having normally bulged ends, FIG. 10 showing a normal can and FIG. 11 showing an abnormal can;

FIGURES 12 and 13 are schematic views, corresponding to FIGURES 10 and 11, of the machine when arranged to pass vacuumized cans and to detect and eject unvacuumized cans, FIG. 12 showing a normal vacuumized can with inwardly flexed end panels and FIG. 13 showing a leaky, non-vacuumized can with flat end panels; and FIG. 14 is a schematic view showing the machine as set to detect a can having only one of its ends bulged outwardly to an abnormal extent.

As a preferred and exemplary embodiment of the instant invention, the drawings disclose a can testing machine, the principal parts of which are mounted on a main frame 20. The sealed cans C which are being tested are each formed with the usual cylindrical body B which has a can end E secured at each end in a double seam D. Each can end E is formed with a central panel P which is adapted to flex inwardly or outwardly, depending on the pressure within the sealed can C. The machine illustrated in FIGS. 1–8 is arranged to detect "rockers," which are cans whose end panels are flexed convexly outwardly to a greater degree than are the end panels in normal cans.

The cans C are fed into the machine along an inclined gravity runway 22. As they approach the machine, the cans C pass beneath a can spacing device (see FIG. 1) which comprises a rubber roller 24 which is freely mounted for rotation on a shaft 26 which is carried at the end of a yoke arm 28 which is pivotally mounted on a pivot pin 30 carried by the upper portion of the machine frame 20.

As each can C engages the roller 24, it is slowed down, thus giving the preceding can C which has just been released by the roller 24 a chance to roll ahead of the engaged can to create sufficient space between the successive cans to permit the machine to operate successfully. The speed of free rotation of the roller 24 can be controlled by a spring-backed friction washer 32 which is mounted on the shaft 26 and engages against one side of the roller 24.

As each can C is released by the spacing device, it rolls down the gravity chute 22 and into the runway, generally designated by the numeral 33, of the can testing machine. The runway 33 is composed of a pair of spaced horizontal plates 34, 36 which extend the length of the machine and engage and support the opposite end seams D of the rolling cans C.

Each can C, as it enters the machine, passes between a pair of side guides 38, 40 which are spaced from each other a distance somewhat in excess of the normal height of the cans being tested so that cans will roll freely and easily. The guide 38 comprises an angle iron which is secured to the plate 34 and extends the full length of the machine while the guide 40 comprises the inner edge of a flat plate 42 which is mounted above the plate 36 and extends only through the testing station, designated by the letter T, which comprises the first portion of the machine. A second plate 44, somewhat smaller than the plate 42 is mounted above the support plate 34 but spaced inwardly of the guide 38. The purpose of this plate 44 will be explained later.

As a can C enters the testing station T, it is engaged by a flexible drive belt 50 (see FIG. 1) which operates around a pair of pulleys 52, 54 which are keyed to shafts 56, 58 which are mounted for vertical adjustment in slots 60 which are formed in vertical brackets 62 which form part of the machine frame 20. The belt 50 is driven in a counter-clockwise direction, as viewed in FIG. 1, by a drive motor 64 via a belt 66 which operates around a large pulley 68 which is keyed to the shaft 58 as seen in FIG. 1.

The lower flight of the belt 50 is pressed into driving engagement against the upper portions of the body of the can C by a pair of small grooved pressure rollers 70 which are pressed downwardly by spring arms 72 which extend from a small bracket 74 carried by the upper portion of the machine frame 20.

As each can C is rolled along the runway 33 by the belt 50, its end seams D come into contact with the inner edges 80 of a pair of probe arms 81, 82 which are mounted on pivot pins 84, 86 carried by the plates 42, 44.

The probe arms 81, 82 are of substantial weight and are pressed inwardly toward each other by a pair of springs 88 so that their free ends project into the runway 33. The inward movement of the arms 81, 82 is limited by a pair of pins 90 which are secured to the plates 42, 44 and operate in slots 94 formed in the probe arms.

The inner edges 80 of the probe arms 81, 82 which are initially contacted by the can C are formed in the shape of gently curving cams which function to center the rolling can C in the runway 33, the fact that the can C is moving forward in rolling engagement with the belt 50 permitting it to move laterally with respect to the belt 50. The cam edges 80 of the probe arms 81, 82 terminate in rounded feeler lobes 92 which are disposed adjacent the free extremities of the arms 81, 82.

The forward movement of the can C along the cam surfaces 80 causes the probe arms 81, 82 to pivot open as the feeler lobes 92 ride over the can end seams D and onto the can end panels P. This pivotal, spreading movement of the probe arms 81, 82 brings a pair of lugs 94, one of which is carried by each of the probe arms, into contact with the actuators 96 of a pair of normally open snap switches 98, 100, one of which is mounted on each of the plates 42, 44 outwardly of the arms 81, 82.

The switches 98, 100 are so positioned relative to the probe arms 81, 82 that their plungers 102 are depressed a sufficient distance to close the switch contacts when the feeler lobes 92 of the probe arms 81, 82 pass over the can end seams D. Thus, the switches 98, 100 will be closed by each can C as it enters the testing station T, regardless of whether it is a good can or a bad can.

As seen in FIG. 8, the snap switches 98, 100 are connected in parallel with each other in a detector circuit G which also includes a normally closed time delay relay 104. In order to prevent the detector circuit G from being energized as the end seams D of each can C close the switches 98, 100, a third, normally open snap switch 106 is incorporated in the detector circuit G in series with each of the switches 98, 100 and with the relay 104.

The switch 106, which may be termed a master switch, is mounted below the runway 33 with its plunger 108 (see FIGS. 2 and 6) in transverse alignment with the high spots of the feeler lobes 92 so that it is closed only when each can C is fully within the testing station T with the feeler lobes 92 in contact with the axially central portions of its end panels P. The switch 106 is not closed when the feeler lobes 92 are in contact with the can end seams D.

Thus, when a normal can, i.e., a can such as is shown in FIG. 10 wherein the end panels P are not bulged outwardly as far as the planes of the outer extremities of the can end seams D, the feeler lobes 92 will move inwardly after they ride off the can end seams D and onto the can end panels P, thus causing the snap switches 98, 100 to return to their normally open position, with the result that no current flows in the detector circuit G, even though at this time the master switch 106 is closed by the can C.

If, however, the can end panels P are abnormally bulged, as shown in FIG. 11, so that they are level with or beyond the planes of the outer extremities of the can end seams D, the switches 98, 100 will be held in closed position by the probe arms 81, 82 when the can C is fully in the testing station T. Since the master switch 106 is also closed at such time, current flows in the detector circuit G, thus energizing the normally closed relay 104 and opening its contacts to thereby break the flow of current in an ejector circuit H, thus de-energizing a pair of solenoids 110, 112 which are mounted in parallel with each other in the circuit H (see FIG. 8).

The solenoids 110, 112 are disposed on either side of the runway 33 at the rear portion of the machine which portion may be designated as an ejector station J. As best seen in FIGURES 2 and 6, the support plates 34, 36 are cut away at the ejector station J and the gaps created thereby are bridged by pivotally mounted track sections 114, 116, the free ends of which are connected to the armatures 118 of the solenoids 110, 112 and are normally held in closed, can supporting position, against the pressures of a pair of compression springs 120, by the normally energized solenoids 110, 112. However, when an abnormal can is detected, the flow of current in the ejector circuit H is cut off, thus de-energizing the solenoids 110, 112 and permitting the springs 120 to pivotally move the track sections 114, 116 outwardly into open position wherein they are not capable of engaging beneath and supporting a can C.

The time delay relay 104 is set so that the track sections 114, 116 remain in this open position until the abnormal can is rolled from the testing station T to the ejecting station J by the belt 50 and drops through the runway 33 between the open track sections 114, 116 (see FIG. 5) to any suitable place of deposit, such as a receptacle 122. Thereafter, the time delay relay 104 closes, thereby resetting the track sections 114, 116 to can supporting position where they remain until the next abnormal can is detected by the machine.

As has already been described, when a good can enters the testing station the probe arms 98, 100 move inwardly to some extent as they ride off the can end seams D, with the result that the switches 98, 100 resume their normally open position, and the detector circuit G remains open. Consequently, the solenoids 110, 112 remain energized, the track sections 114, 116 remain in can-supporting position, and the normal can rolls through the ejector station J unmolested and is discharged into a discharge chute 124.

FIGURES 12 and 13 illustrate the operation of the machine when utilized in conjunction with cans C which have been vacuumized before sealing. The can end panels P in such cans are normally bowed inwardly due to the pressure differential, as seen in FIG. 12. However, the end panels P of leaky cans are not so bowed, but remain substantially flat, as seen in FIG. 13, because they retain little or no internal vacuum. The operation of the machine with vacuumized cans is very similar to its operation with bulged cans, the switches 98, 100 being normally open but being closed by the double seams D of each can C as it enters the testing station T. The master switch 106 however, remains open until the can C is fully within the station T, so that the detector circuit G is not closed by virtue of the action of the can end seams D in closing the switches 98, 100.

After the feeler lobes 92 ride off the can end seams D, they ride onto the can end panels P, thus permitting the feeler probes 81, 82 to move inwardly. The switches 98, 100 are set so that they remain closed in the event the can end panels P are flat, as seen in FIG. 13. Since at this time the master switch 106 is closed by the can C, the detector circuit G is energized, the track sections 114, 116 are moved to open position and the leaky can is ejected from the machine when it reaches the ejector station J.

If the can C is a normal, non-leaky can, the feeler lobes 81, 82 move farther inwardly because of the bowed can end panels P, and such movement permits the switches 98, 100 to return to their normal open position so that the detector circuit G is not energized and the can C is not ejected.

In the two testing operations just described, both ends of the cans being tested were of uniform construction and contour so that they flexed outwardly or inwardly to the same degree, but in opposite directions. It is possible, however, to operate the machine of the instant invention in conjunction with cans wherein the end members are of non-uniform construction, so that the opposite ends of the cans do not flex to a uniform degree.

FIGURE 14 shows a can which is so constructed that one of its ends, the end to the right as viewed in FIG. 14, is made of thinner material and is thus more flexible than its other end, which may also be provided with reinforcing corrugations (not shown) to limit or preventing its flexing. When a can of such construction having its flexible end bulged outwardly to an abnormal degree is sent through the machine, the probe arm 81 will contact the outwardly bulged end panel P and will thus close the switch 98 while the probe arm 82 which contacts the reinforced non-bulged end will permit the switch associated with it to return to its normally open position. Since, however, the switches 98, 100 are connected in parallel in the detector circuit G of FIG. 8, it is only necessary that one of them be closed in order to energize the control circuit G. Thus, the can of FIG. 14 will be ejected when it reaches the ejecting station J. This will be true regardless of which end of the can is abnormally contoured. There is no appreciable lateral movement of the can during this testing operation, even though the springs 88 are compressed to different degrees.

It is obvious that the detector switches 98, 100 and the detector and ejector circuits G and H may be suitably altered to enable the machine of the instant invention to detect many different kinds of can abnormalities. FIG. 9 shows a control circuit which may be utilized in place of the control circuit of FIG. 8. The circuit of FIG. 9 differs from that of FIG. 8 in that the switches 98, 100 are connected into the detector circuit G in series with the time delay relay 104 and with the master switch 106. In this version of the invention, it is obvious that both of the detector switches 98, 100 must be closed in order to effect the ejection of an abnormal can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A machine for detecting and ejecting sealed cans having abnormally contoured end panels, comprising:
   a can runway in which the cans are advanced with their axes normal to the direction of advancement,
   a pair of probe arms pivotally mounted adjacent one of the ends thereof on opposite sides of said runway and disposed in transverse alignment,
   means for resiliently urging each of said probe arms inwardly to a position wherein the free end portion thereof extends into said runway in the path of the cans,
   each of said probe arms being of substantially rigid construction and having on its inner surface a gradually inwardly extending cam portion for engaging the adjacent end seams of the cans to center them in the runway.
   said cam portion merging into a feeler portion formed on the inner surface of each of said probe arms adjacent the free end portion thereof and adapted to ride over the adjacent end seams of the cans and to engage the adjacent end panels of the cans after they are centered in said runway by said cam portions,
   a detector switch disposed adjacent each of said probe arms and operable thereby when said probe arms engage abnormally contoured end panels,
   a master switch connected to said detector switches and having an actuating member mounted in said runway in transverse alignment with said feeler portions of said probe arms, said actuating member being engageable by the cans in said runway to actuate said master switch only when said feeler portions of said probe arms are in engagement with the central portions of the can end panels,
   ejector means for ejecting cans having abnormally contoured end panels, and
   a control circuit for operating said ejector means, said control circuit including said detector switches and said master switch, said master switch being connected into said control circuit in series with said detector switches so that said detector switches alone are not operable to cause ejection of cans having abnormally contoured end panels.

2. The machine of claim 1 wherein said ejector means include a gate section formed in said runway to separate the normally contoured cans from the abnormally contoured cans.

3. The machine of claim 2 wherein said control circuit includes time delay means for insuring operation of said ejector gate section a sufficient period of time for complete ejection of each abnormally contoured can from said runway.

4. The machine of claim 1 wherein one of said detector switches is connected in parallel with the other of said detector switches in said control circuit.

5. The machine of claim 1 wherein one of said detector switches is connected in series with the other of said detector switches in said control circuit.

References Cited in the file of this patent
UNITED STATES PATENTS

| | | |
|---|---|---|
| 2,293,586 | Bardet | Aug. 18, 1942 |
| 2,327,629 | Fedorchak | Aug. 24, 1943 |
| 2,355,051 | Braucher | Aug. 8, 1944 |
| 2,400,507 | Henszey | May 21, 1946 |
| 2,689,647 | Hoffstetter | Sept. 21, 1954 |
| 3,003,631 | Stock | Oct. 10, 1961 |